US007064964B2

(12) United States Patent
Peng

(10) Patent No.: US 7,064,964 B2
(45) Date of Patent: Jun. 20, 2006

(54) USB POWER AMPLIFIED TRUMPET CONNECTING DEVICE

(76) Inventor: Tseng-Tien Peng, 235 P.O. Box 10-69, Taipei (TW)

( * ) Notice: Subject to any disclaimer, the term of this patent is extended or adjusted under 35 U.S.C. 154(b) by 272 days.

(21) Appl. No.: 10/662,414

(22) Filed: Sep. 16, 2003

(65) Prior Publication Data

US 2005/0058306 A1 Mar. 17, 2005

(51) Int. Cl.
*H05K 7/14* (2006.01)
*H05K 7/18* (2006.01)

(52) U.S. Cl. ...................... 361/797; 361/732; 361/784; 361/803; 174/255

(58) Field of Classification Search ................ 361/797, 361/737
See application file for complete search history.

(56) References Cited

U.S. PATENT DOCUMENTS

| | | | | |
|---|---|---|---|---|
| 4,023,887 | A * | 5/1977 | Speers | 385/50 |
| 5,661,583 | A * | 8/1997 | Nhu | 398/141 |
| 6,490,163 | B1 * | 12/2002 | Pua et al. | 361/737 |
| 6,823,141 | B1 * | 11/2004 | Miyauchi et al. | 398/147 |
| 6,921,284 | B1 * | 7/2005 | Sirichai et al. | 439/490 |

* cited by examiner

*Primary Examiner*—Kamand Cuneo
*Assistant Examiner*—Ivan Carpio

(57) ABSTRACT

A USB power amplified trumpet connecting device comprises a digital conversion chip and a power amplifier chip on a circuit board; an input connected to a USB port as an input; and an output. The output is connected to one of an earphone, a trumpet, or an optical fiber terminal. The output seat is an optical output seat which is connected to an optical fiber terminal for further connecting to a decoding amplifier and then to a trumpet. Another the output can be an output wire; and the output wire is connected to a trumpet. The output is an output seat; and the output seat is able to output cable signals and optical fiber signals for being connected to one of an earphone, a trumpet and an optical fiber terminal.

1 Claim, 7 Drawing Sheets

E
F
P
C
B
O

USB POWER AMPLIFIED TRUMPET CONNECTING DEVICE

FIELD OF THE INVENTION

The present invention relates to USB devices, and particularly to a USB power amplified trumpet connecting device which can be connected to various output device by using different output seat or output wire; and the USB power amplified trumpet connecting device is connected to an USB port as an input.

BACKGROUND OF THE INVENTION

In general, a trumpet need an AC power wire, a transformer, and USB wires. Moreover, circuit board is installed in a sound box so that the volume of the sound box is small and this it is inconvenient to carry out the trumpet. Moreover, the installation process is complicated and power can not be improved and sound quality is bad. Cost is high. Thereby, the prior art trumpets are not accepted by people and thus not widely used.

SUMMARY OF THE INVENTION

Accordingly, the primary object of the present invention is to provide a USB power amplified trumpet connecting device. The device comprises a digital conversion chip and a power amplifier chip on a circuit board; an input connected to a USB port as an input; and an output. The output is connected to one of an earphone, a trumpet, or an optical fiber terminal. The output may be an output seat which is an optical output seat for further being connected to an optical fiber terminal. Then the optical fiber terminal is further connected to a decoding amplifier and then to a trumpet. Another, the output can be an output wire; and the output wire is connected to a trumpet. The output is an output seat; and the output seat is able to output cable signals and optical fiber signals for being sent to one of an earphone, a trumpet and an optical fiber terminal.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
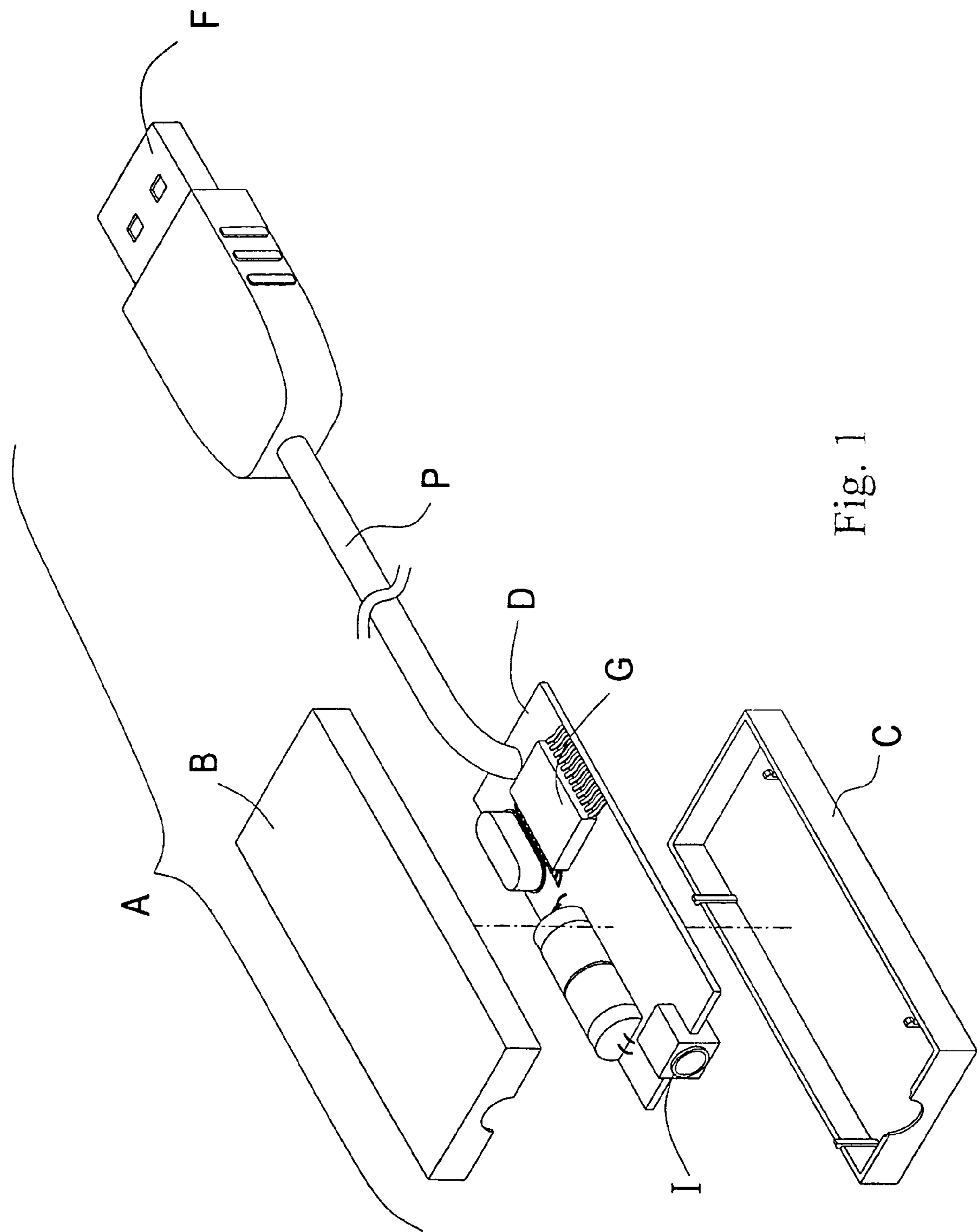
FIG. 1 is an exploded perspective view of the present invention.
Figure 2:
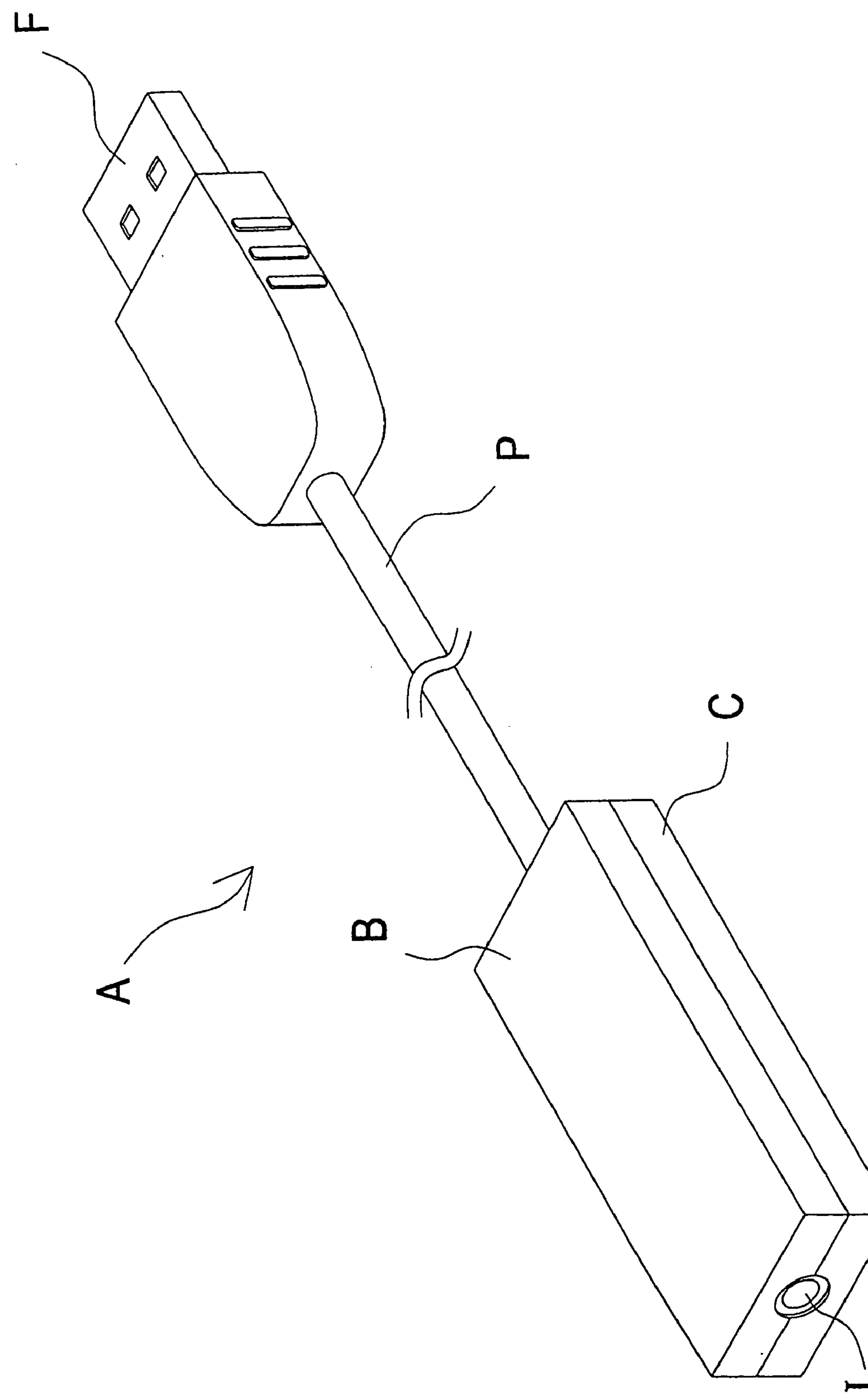
FIG. 2 is a perspective view of the present invention.
Figure 6:
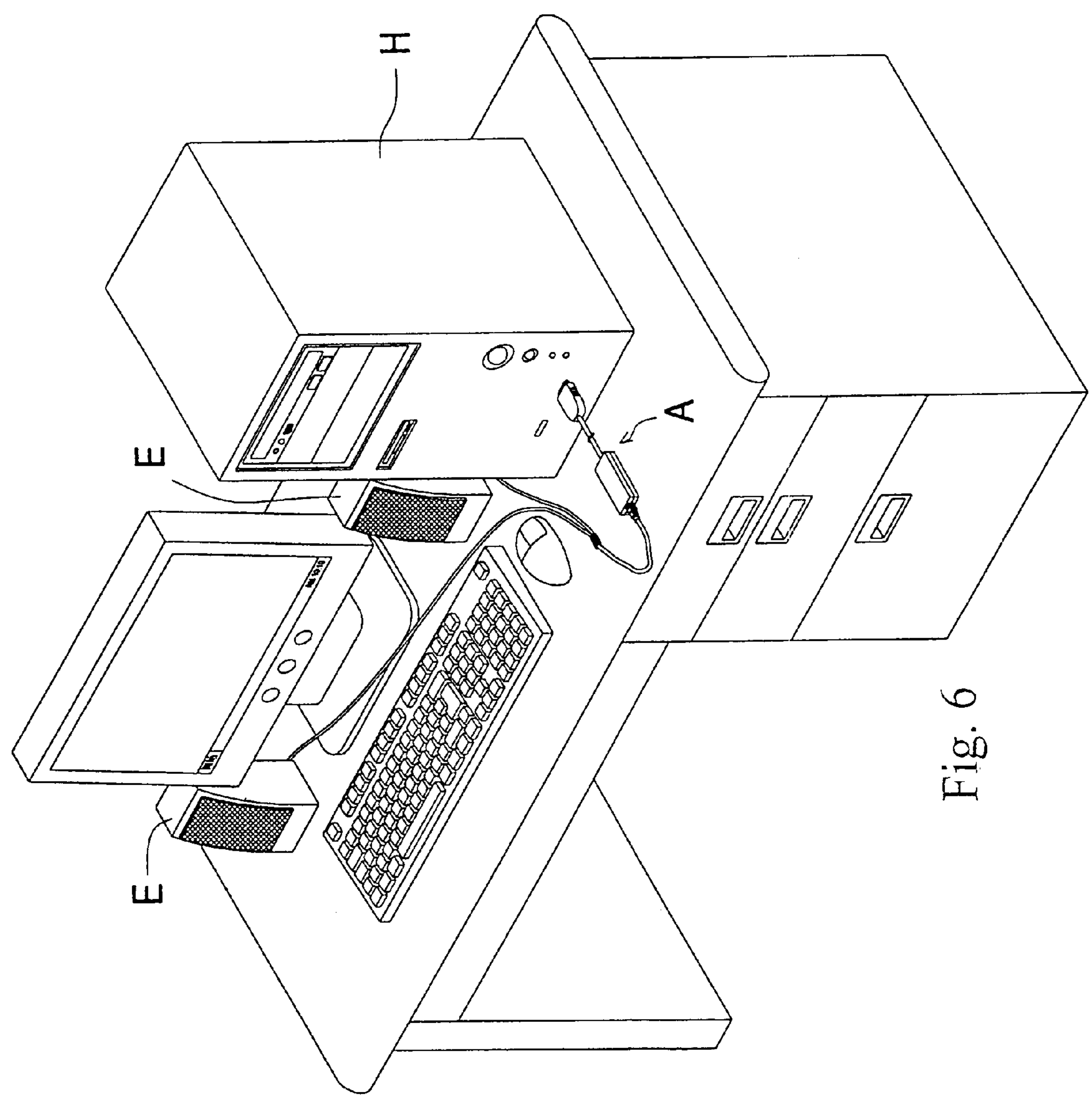
FIG. 6 is a schematic view showing that the present invention is connected to a computer.
Figure 7:
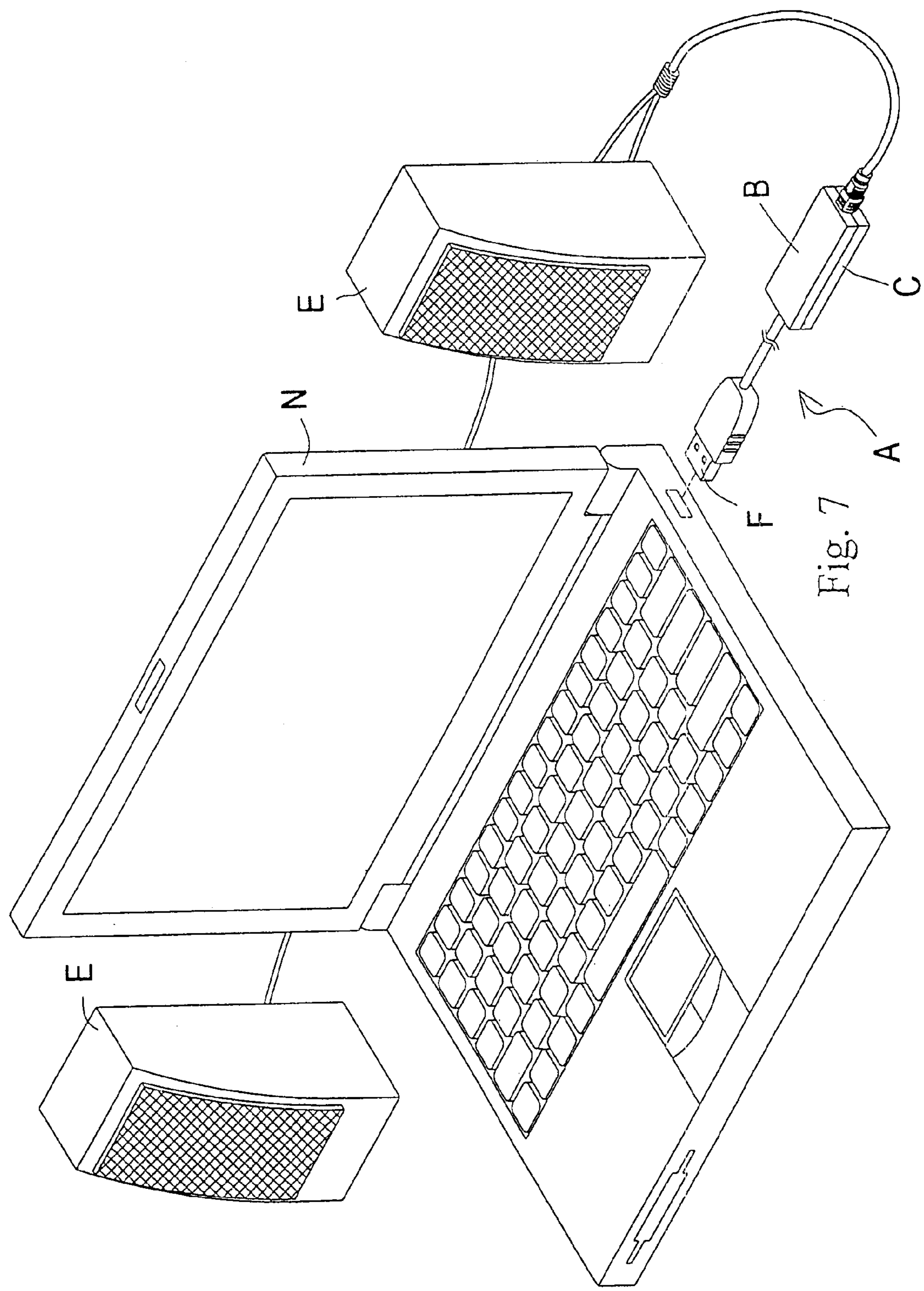
FIG. 7 is a schematic view showing that the present invention is connected to a notebook computer.

Referring to FIG. 1, the USB power amplified trumpet connecting device of the present invention is illustrated. The USB power amplified trumpet connecting device A is formed by an upper cover B, a lower cover C, a circuit board D, and a trumpet E. Chips (a digital conversion chip and a power amplifier chip) G are installed on the circuit board D and is connected to the USB port F by a connecting wire P. The connection of the upper cover B and lower cover C are illustrated in FIG. 2. The USB power amplified trumpet connecting device A of the present invention is combined to a USB slot of a personal computer H or a notebook computer N through the USB port F, as shown in FIGS. 6 and 7.

Figure 3:
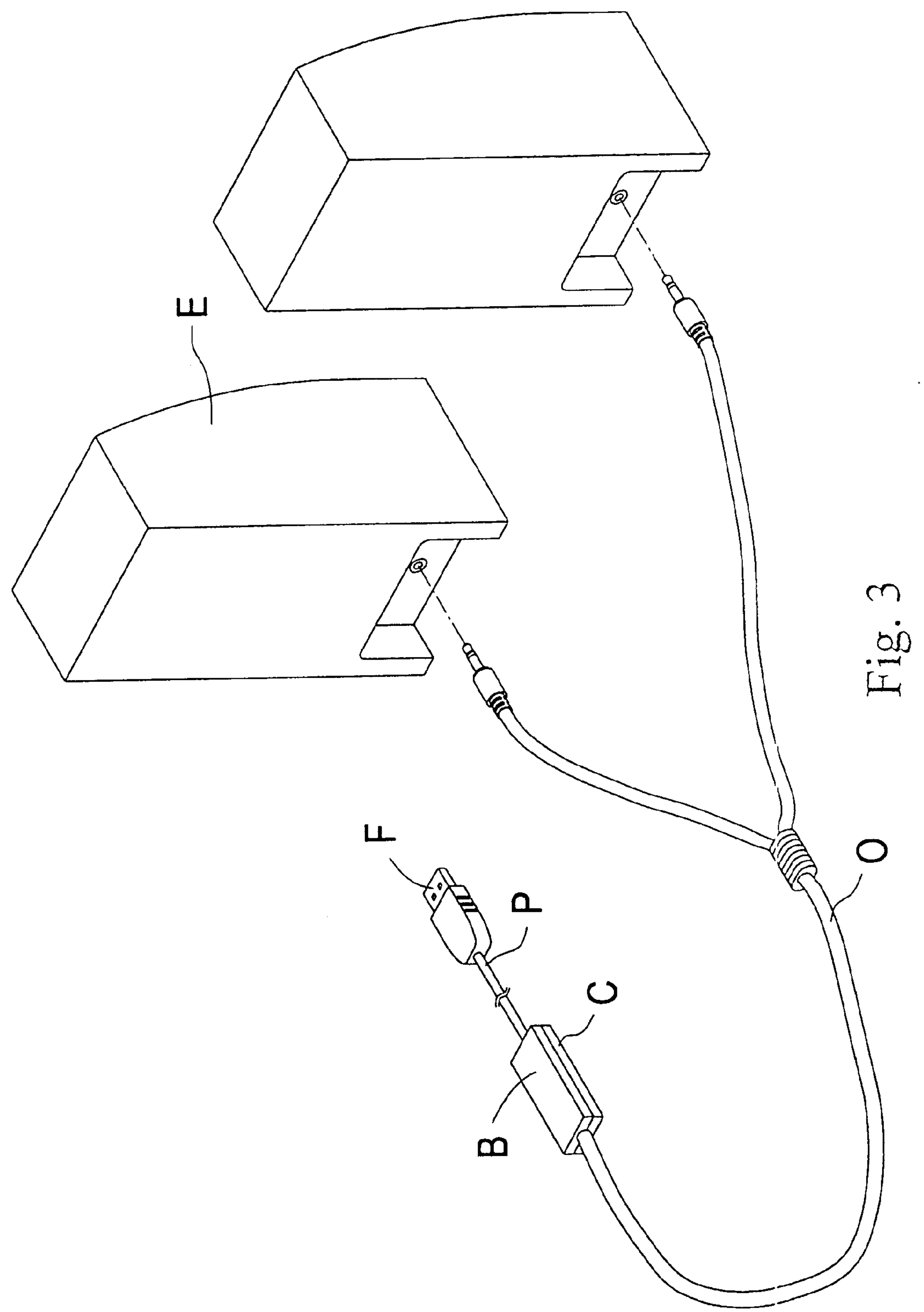
FIG. 3 shows one embodiment of the present invention.

With reference to FIG. 3, the in the USB power amplified trumpet connecting device A of the present invention, the USB port F is connected to the circuit board D through the connecting wire P. The present invention is integrally formed with an output seat I for an output, as shown in FIGS. 3 and 4.

Figure 4:
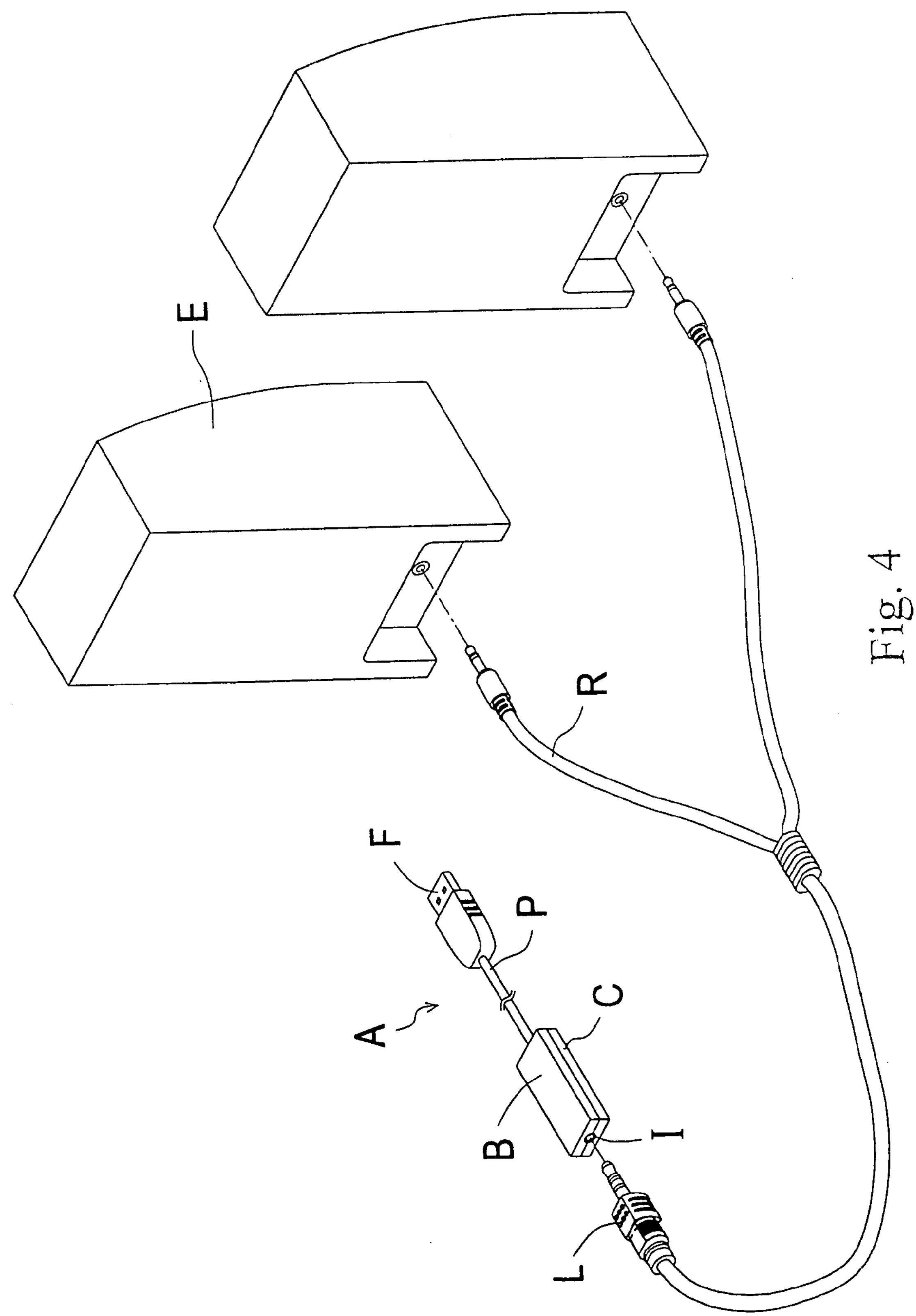
FIG. 4 shows one embodiment of the output connector of the present invention.

Referring to FIG. 4, the USB power amplified trumpet connecting device A may have an output seat I contained in the space formed by the upper cover B and lower cover C. The output seat I is connected to a Y shape connecting wire R. The Y shape connecting wire R is an audio terminal. The Y shape connecting wire R is connected to a trumpet E as a first embodiment of the present invention.

Figure 5:
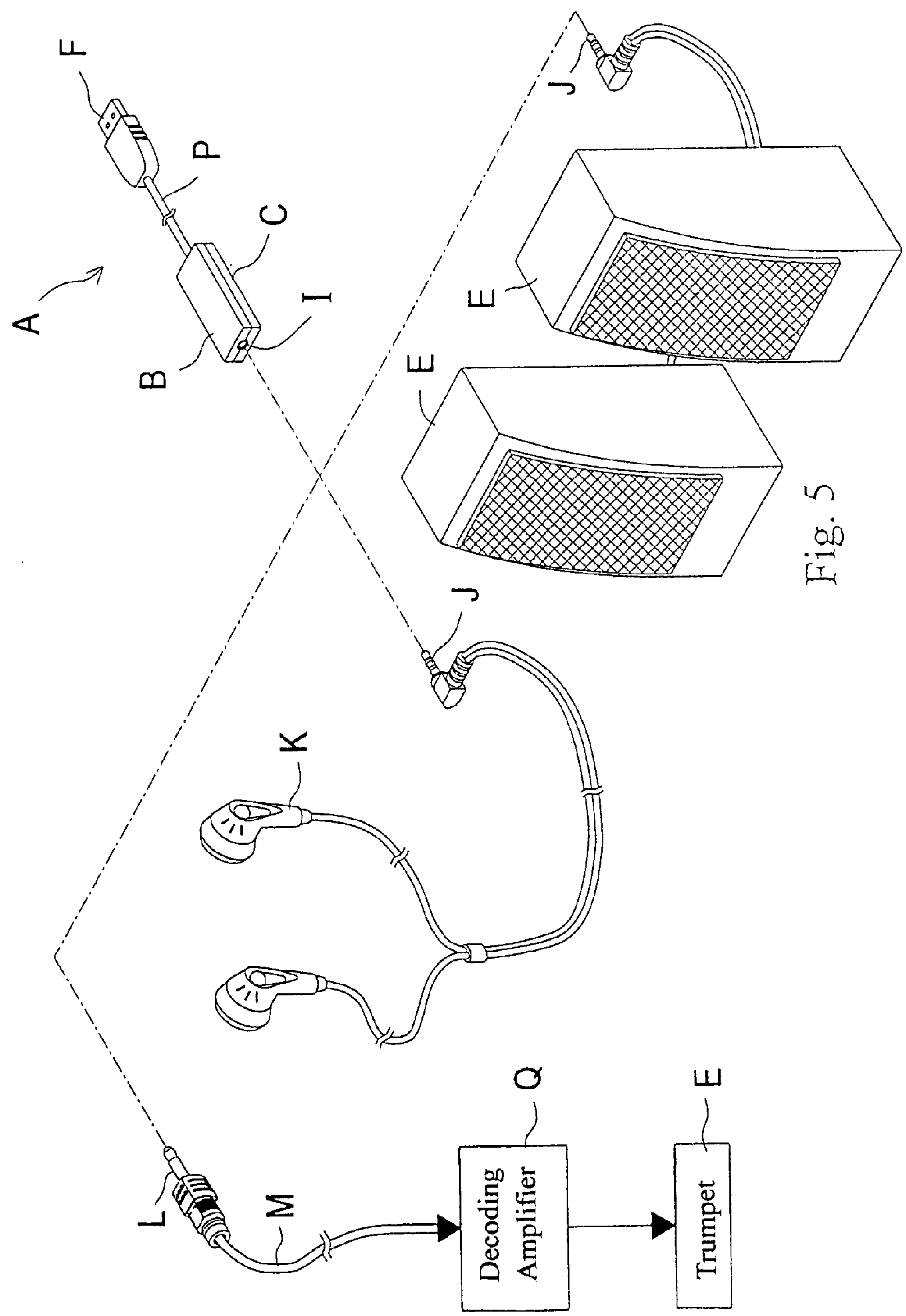
FIG. 5 shows another embodiment of the output connector of the present invention.

With reference to FIG. 5, the USB power amplified trumpet connecting device A can be connected to a trumpet E, an earphone K through an earphone audio terminal J or an optical fiber terminal L. If the present invention is connected to an optical fiber terminal L; the optical fiber terminal L is further connected to a decoding amplifier Q through an optical fiber wire M and then to a trumpet E.

No matter what output device is connected to the USB power amplified trumpet connecting device A, the USB power amplified trumpet connecting device can be connected to a personal computer H or a notebook computer N through a USB port F. The output signals of the personal computer H or the notebook computer N can be input to the circuit board D. Then the signals are processed by the chip G on the circuit board D, in that the chip G may be a digital conversion chip and a power amplifier chip. Then the processed signal is outputted to any device connected to the present invention. The data transmission of the chip G (including digital conversion chip and a power amplifier chip) is based on USB protocol. The USP protocol is known in the prior art and thus the details will not be further described here.

With reference to FIGS. 6 and 7, two embodiments of the present invention are illustrated. In FIGS. 6 and 7, no matter what device (a personal computer H or a notebook computer N) is as an input of the present invention, the personal computer H and the notebook computer N are installed with USB slots for connected to the present invention. In the present invention, the chip G can be used as an audio processor for amplifying audio signals so as to have a preferred audio effect.

Advantages of the present invention will be described here. In the present invention, the digital conversion chip and a power amplifier chip are not in a trumpet box and thus the sound effect is preferred and it can be carried easily. The installation work can be done easily. No AC power wire and transformer are required. The digital conversion chip and power amplifier chip are connected to the same USB port so that the power is larger and efficiency is improved. The present invention can be connected by various ways and the installation is easy.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A USB power amplified trumpet connecting device comprising an upper cover (B), a lower cover (C) engaged to the upper cover (B) so as to form a receiving space;

a circuit board (D) installed within the receiving space formed by the upper cover (B) and lower cover (C);

a digital conversion chip and a power amplifier chip (G) located on a circuit board;

an input connected to a USB port as an input; and an output seat (I) capable of being connected to one of an earphone, a trumpet, and an optical fiber terminal;

an earphone audio terminal connected to a Y shape connecting wire (R); the Y shape connecting wire (R) is an audio terminal; the Y shape connecting wire (R) is connected to a trumpet (E);

an optical fiber terminal (L) connected to an optical fiber terminal (L); the optical fiber terminal (L) being further connected to a decoding amplifier (Q) through an optical fiber wire (M) and then to a trumpet (E).

* * * * *